United States Patent
Simofi-Ilyes et al.

(10) Patent No.: US 7,977,835 B2
(45) Date of Patent: Jul. 12, 2011

(54) ELECTRIC MOTOR COOLING MODULE HAVING BEARING STRUCTURE NESTED DIRECTLY IN A BRUSH AND CONNECTOR UNIT THAT IS MOUNTED DIRECTLY TO A COVER OF A SHROUD

(75) Inventors: Attila Simofi-Ilyes, London (CA); Paul Stephen McLennan, London (CA); Andrew Lakerdas, London (CA)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 40 days.

(21) Appl. No.: 12/071,210

(22) Filed: Feb. 19, 2008

(65) Prior Publication Data
US 2008/0203830 A1 Aug. 28, 2008

Related U.S. Application Data

(60) Provisional application No. 60/903,520, filed on Feb. 27, 2007.

(51) Int. Cl.
- *H02K 13/00* (2006.01)
- *H02K 9/00* (2006.01)
- *H02K 5/00* (2006.01)
- *H02K 5/10* (2006.01)
- *H02K 5/12* (2006.01)

(52) U.S. Cl. ............. 310/89; 310/58; 310/71; 310/85; 310/91; 310/238; 310/239; 310/242; 310/245; 310/247; 417/423.7

(58) Field of Classification Search .......... 310/58, 310/16, 55, 85, 89, 91, 71, 238, 239, 242, 310/245, 247; 417/423.7; H02K 9/00, 13/00, 5/00, 5/10, 5/12; H01F 27/08
See application file for complete search history.

(56) References Cited

U.S. PATENT DOCUMENTS

| | | | |
|---|---|---|---|
| 2,238,440 A | * | 4/1941 | Chayes ..................... 310/50 |
| 5,871,335 A | * | 2/1999 | Bartlett ................... 416/244 R |

(Continued)

OTHER PUBLICATIONS

Definition of "integral." Dictionary.com Unabridged. Random House, Inc. Nov. 30, 2010. <Dictionary.com http://dictionary.reference.com/browse/integral>.*

*Primary Examiner* — Quyen Leung
*Assistant Examiner* — Michael Andrews
(74) *Attorney, Agent, or Firm* — Manelli Denison & Selter PLLC; Edward J. Stemberger

(57) ABSTRACT

A cooling module includes a shroud (38) having an integral cover (42). The cover receives a bearing structure (40). A fan (36) is provided for moving air. A rotor and stator assembly (30) has an opened end and includes a stator (29) having permanent magnets. A rotor (31) includes a lamination stack (16), windings (21), a commutator (20); and a shaft (18). The rotor is associated with the stator so as to rotate with respect thereto. One end (34) of the shaft is coupled with the fan and another end (39) of the shaft is received by the bearing structure. A brush and connector unit (52) is associated with the cover of the shroud and includes brushes (58) associated with the commutator, and an electrical connector (62). The cover covers the opened end of the rotor and stator assembly and covers at least a portion of a brush and connector unit.

20 Claims, 7 Drawing Sheets

U.S. PATENT DOCUMENTS

| | | |
|---|---|---|
| 6,694,599 B1 | 2/2004 | Kershaw et al. |
| 6,838,799 B1 * | 1/2005 | Caiozza .......................... 310/89 |
| 2005/0012411 A1 * | 1/2005 | Hoffman et al. ................ 310/63 |
| 2005/0012422 A1 * | 1/2005 | Caiozza ........................ 310/190 |
| 2006/0103245 A1 * | 5/2006 | Simofi-Ilyes et al. .......... 310/58 |
| 2007/0024135 A1 * | 2/2007 | Simofi-Ilyes et al. .......... 310/89 |

* cited by examiner

ELECTRIC MOTOR COOLING MODULE
HAVING BEARING STRUCTURE NESTED
DIRECTLY IN A BRUSH AND CONNECTOR
UNIT THAT IS MOUNTED DIRECTLY TO A
COVER OF A SHROUD

This application claims the benefit of the earlier filing date of U.S. Provisional Application No. 60/903,520, filed on Feb. 27, 2007, the content of which is hereby incorporated by reference into this specification.

FIELD OF THE INVENTION

This invention relates to modules, which include a DC motor, a fan and a shroud assembly, used in automotive engine cooling applications and, more particularly, to a module of reduce cost an easy to assemble.

BACKGROUND OF THE INVENTION

Conventionally, in a typical engine cooling module such as the one described in U.S. Patent Publication 2007/0024135 A1, the content of which is hereby incorporated by reference into this specification, the electric motor is a discrete subassembly. This publication shows a single module with one motor, one fan and one shroud. However there are conventional dual modules that include two motors, two fans and one shroud. Each motor in these dual modules is also a discrete subassembly.

With reference to FIG. 1, the conventional motor assembly, generally indicated at 10, includes a motor case 12 with permanent magnets 14 mounted to the inside thereof. The motor assembly 10 includes an armature assembly having a lamination stack 16 for receiving windings (not shown). The armature assembly rotates a shaft 18. A commutator 20 of the armature assembly is associated with the armature stack 16 for delivering electric current from brushes 22 of a brush card assembly 24 to the armature windings in the conventional manner. An end cap 26 covers the brush card 24 and thus closes and partially covers the open end of the motor case 12. The end cap 26 includes a bushing assembly 28 that supports an end of the shaft 18. Thus, the conventional motor assembly includes many subassemblies which are produced on very specific designated assembly lines. This can be quite costly.

There is a need to combine/integrate conventional module components such that some of the motor subassemblies and/or components are either eliminated, or simplified, or built-in, or become an integrated part of a shroud, thereby increasing reliability of the module and reducing overall module cost and manufacturing costs.

SUMMARY OF THE INVENTION

An object of the invention is to fulfill the need referred to above. In accordance with the principles of the present invention, this objective is obtained by providing a cooling module including a shroud having an integral cover. The cover receives a bearing structure. A fan is provided for moving air. A rotor and stator assembly has an opened end and includes a stator removably mounted and in fixed relation with respect to the shroud. The stator has permanent magnets. A rotor of the rotor and stator assembly includes a lamination stack, windings associated with the lamination stack, a commutator; and a shaft. The rotor is associated with the stator so as to rotate with respect thereto. One end of the shaft is coupled with the fan and another end of the shaft is received by the bearing structure. A brush and connector unit is associated with the cover of the shroud and includes brushes associated with the commutator, and an electrical connector. The cover directly covers the opened end of the rotor and stator assembly and covers at least a portion of a brush and connector unit.

In accordance with another aspect of the disclosed embodiment, a cooling module includes a shroud having means for covering, the means for covering receiving a bearing structure. Means for moving air is provided. A rotor and stator assembly has an opened end and includes a stator removably mounted and in fixed relation with respect to the shroud. The stator has permanent magnets. A rotor of the rotor and stator assembly includes a lamination stack, windings associated with the lamination stack, a commutator; and a shaft. The rotor is associated with the stator so as to rotate with respect to the stator. One end of the shaft is coupled with the fan, another end of the shaft is received by the bearing structure. Means for providing current to the commutator and thus the windings is associated with the means for covering. The means for covering closes the opened end of the rotor and stator assembly and covers at least a portion of the means for providing current.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 2:
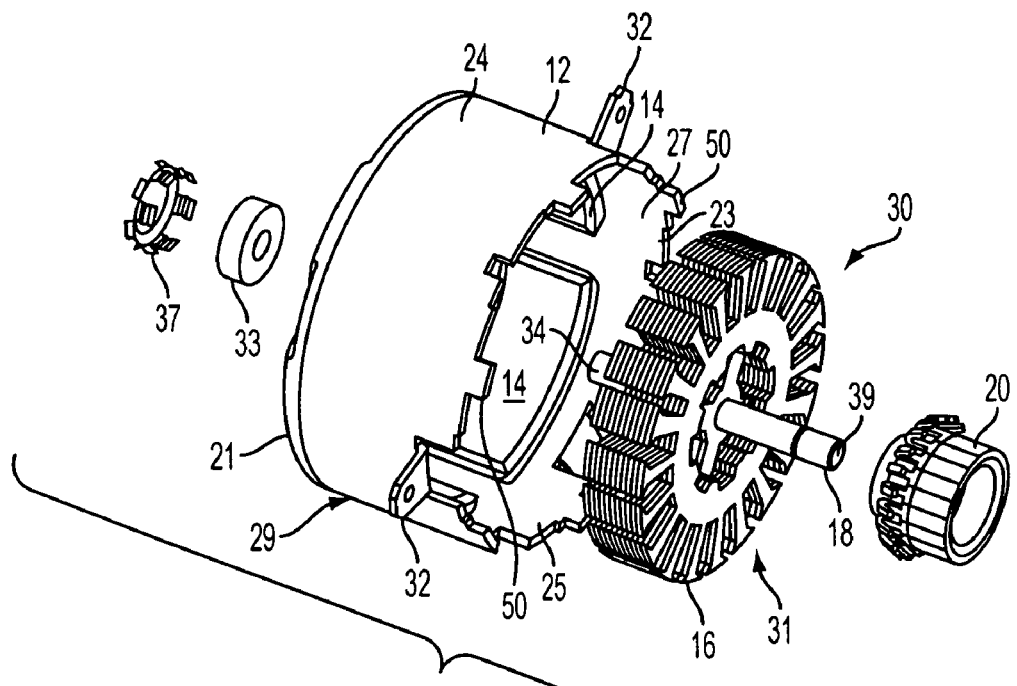
FIG. 2 is an exploded view of a rotor and stator assembly of a module provided in accordance with an embodiment of the invention.

With reference to FIG. 2, an exploded view of a rotor and stator assembly in accordance with an embodiment of the invention is shown, generally indicated at 30. The assembly 30 includes a motor case 24 having a generally cylindrical wall 25, preferably a closed end 21, and an opposing open end 23, defining an interior 27. Permanent magnets 14 are mounted to the inside surface of wall 25 within the interior 27. In the embodiment, four permanent magnets 14 (only two are seen in FIG. 2), are provided, although one or more magnets can be provided. The case 24 and magnets 14 define a stator, generally indicated at 29 (stationary structure), that receives a conventional armature assembly or rotor, generally indicated at 31, that includes a lamination stack 16, shaft 18, windings 15 (FIG. 3) and commutator 20.

As shown in FIG. 2, the assembly 30 includes a plurality (e.g., at least two) of folded out tabs or brackets 32 for mounting the assembly 30 to a shroud as will be explained more fully below.

In addition to the components of the assembly 30, shown in FIG. 2, typically there is also some type of fan attachment adapter (not shown) pressed onto the end 34 of the shaft 18. However, in the embodiment, the assembly 30 does not include the fan adapter since the fan adapter is insert molded into a hub 53 (FIG. 3) of a fan 36 and the fan 36 is pressed onto the shaft 18. A bearing 33 and retainer 37 are associated with the end 34 of the shaft 18.

Figure 4:
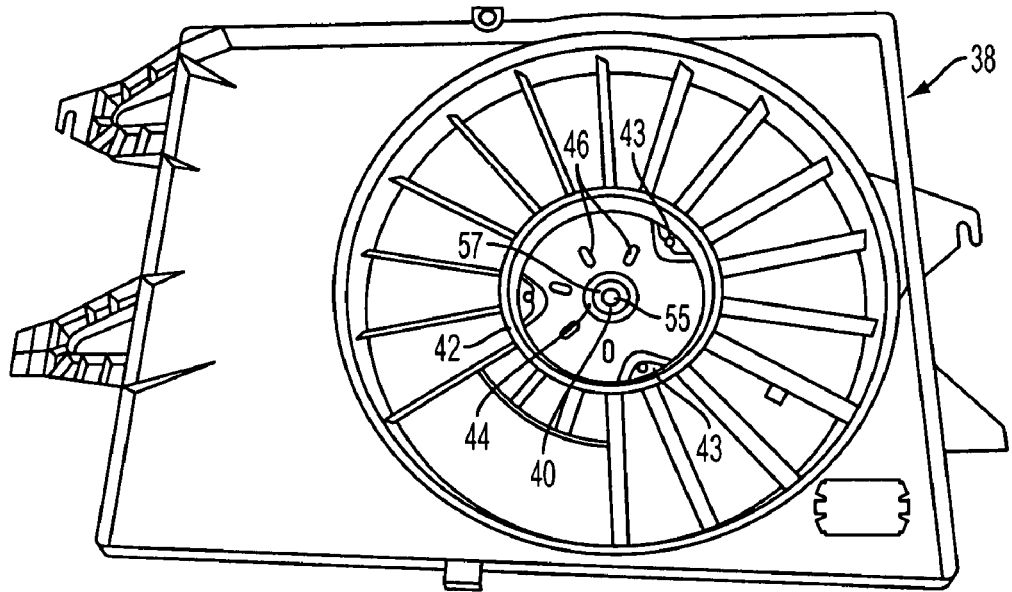
FIG. 4 is a front view of a shroud structure provided in accordance with an embodiment of the invention.

With reference to FIG. 4, a shroud structure, generally indicated at 38, is shown configured for single fan use. A cover 42, integral with the shroud structure 38, nests a bearing structure 40. The bearing structure 40 receives an end 39 (FIG. 2) of the shaft 18. It can be appreciated that the bearing structure 40 can be applied to shroud structures where two or more motors/fans are being used. As used herein, the term "bearing structure" refers to any structure suitable for supporting an end of a rotating shaft.

The bearing structure 40 nested in the cover 42 can be provided in a few different ways. As shown in FIG. 4, a metallic housing 44 that receives a bearing 55 and a bearing retainer 57 can be insert-molded or pressed into the cover 42 after molding. The housing 44 can be considered to be part of the bearing structure 40 along with the bearing 55 and retainer 57. Thereafter, the bearing structure 55 can be inserted into the housing 44. Alternatively, the housing 44 for the bearing 55 can be made from the same material and/or molded with the shroud structure 38, depending on the actual application of the engine cooling module. For example, for low temperature applications (such as ambient temperature less than 80° C.) or low power applications (such as where the electrical power is less than 100 W) the bearing 55 can be directly nested into a feature or pocket molded onto the cover 42 without the additional metallic housing 44. The bearing 55 can be retained by the spring retainer 55 having fingers that allow for bearing misalignment in the assembly of the rotor and stator assembly 30 to the cover 42 of the shroud structure 38. However, the bearing structure 55 can be pressed into a molded pocket in the cover 42 without the retainer 55. Alternative methods of retention could include threaded fasteners, snap-fits, rivets, adhesive bonding, heat staking, friction/ultrasonic welding or other suitable means. The retainer 55 can also be integral with the cover 42.

Figure 5:
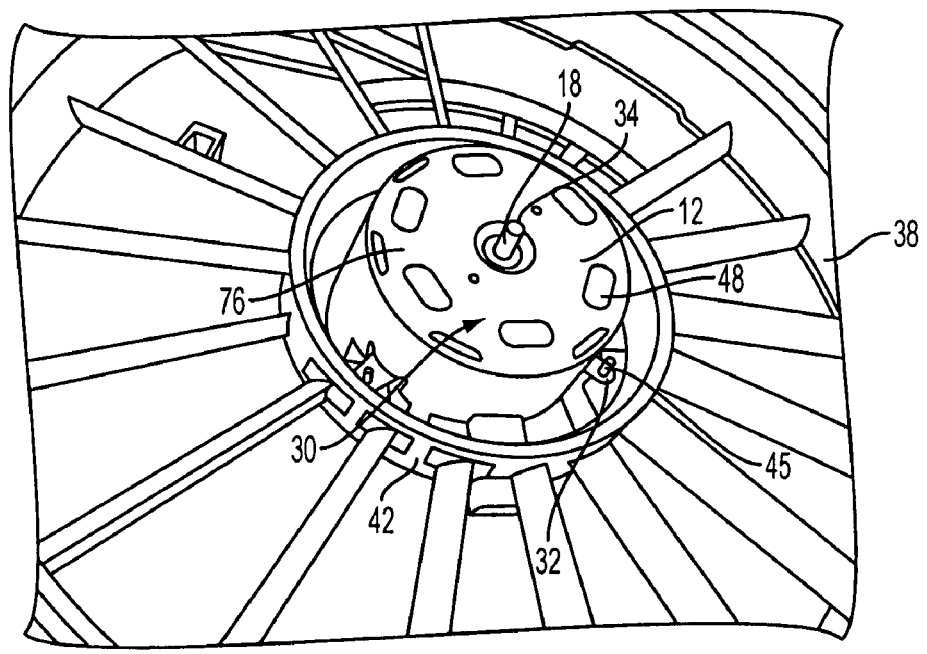
FIG. 5 is view of the rotor and stator assembly of FIG. 2 shown mounted to the shroud structure.

As shown in FIG. 4, the cover 42 includes mounting bosses 43 that are constructed and arranged to receive fasteners 45 (FIG. 7) or the like that are associated with the mounting tabs 32 of the motor case 12 (FIG. 2). Also, vent holes 46 can be provided in the cover 42 to allow airflow through the critical area of rotor and stator assembly 30 without allowing contamination entering to the commutation interface. It is important to maintain optimum temperature of the armature winding, brushes and commutator in order to achieve sufficient/long motor life. The requirement for the vent holes 46 and the size of the vent holes 46 depends on the specific application and should be evaluated on a case to case basis. Vent holes 48 are also provided in the motor case 12 and are best seen in FIG. 5. The motor cooling airflow path is described in U.S. Patent Publication No. 2006/0103245 A1, the content of which is hereby incorporated by reference into this specification.

Figure 3:
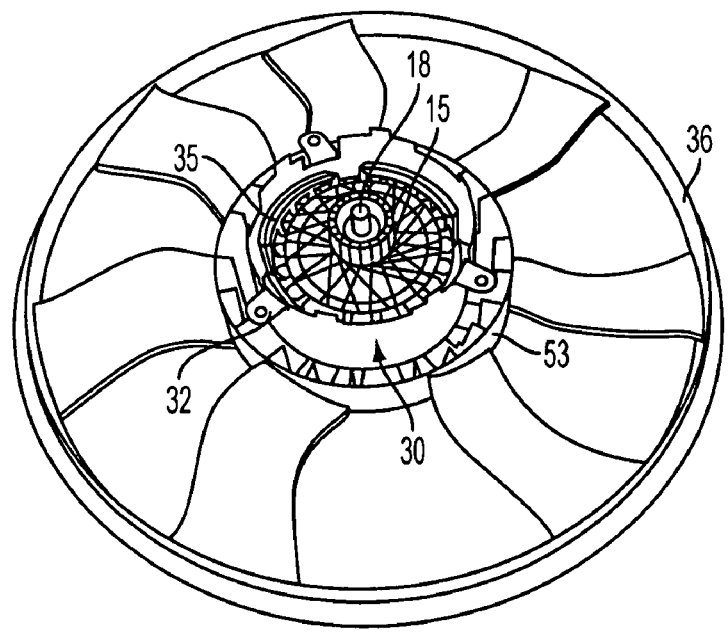
FIG. 3 is a view of the rotor and stator assembly of FIG. 2 shown mounted to a fan.

With reference to FIG. 3, the fan 36 can be mounted (e.g., pressed on) to the end 34 of shaft 18 of the rotor and stator assembly 30 prior to fastening the rotor and stator assembly 30 to the cover 42 of the shroud structure 38. The advantage of this method of assembly is that couple balance correction (in two different planes can be performed easily and in a cost-effective manner since the back side of the rotor and stator assembly 30 is open. This balancing minimizes overall vibration.

Another way to assembly the module is shown in FIG. 5 where the rotor and stator assembly 30 is fastened onto the cover 42 via tabs 32 and fasteners 45 and then the fan 36 is pressed (mounted) onto the end 34 of shaft 18 of the rotor and stator assembly 30. The shaft 18 needs to be supported at end 39 (FIG. 2) thereof during this assembly step. For this type of fan attachment method, an access hole needs to be added in the center of cover 42 to support the shaft 18 while the fan is being pressed on. Thereafter, the hole needs to be covered to avoid contamination entering to the bearing structure 40. Thus, in both assembly methods mentioned, the cover 42 directly covers the opened end 35 (FIG. 3) of the rotor and stator assembly 30 and no end cap is required.

The fan 36 also can be attached to rotor and shaft assembly 30 by use of fan adapters that are pressed onto the shaft 18. An example of this type of fan adapter is described in U.S. Pat. No. 5,871,335, the content of which is hereby incorporated by reference into this specification.

Figure 1:
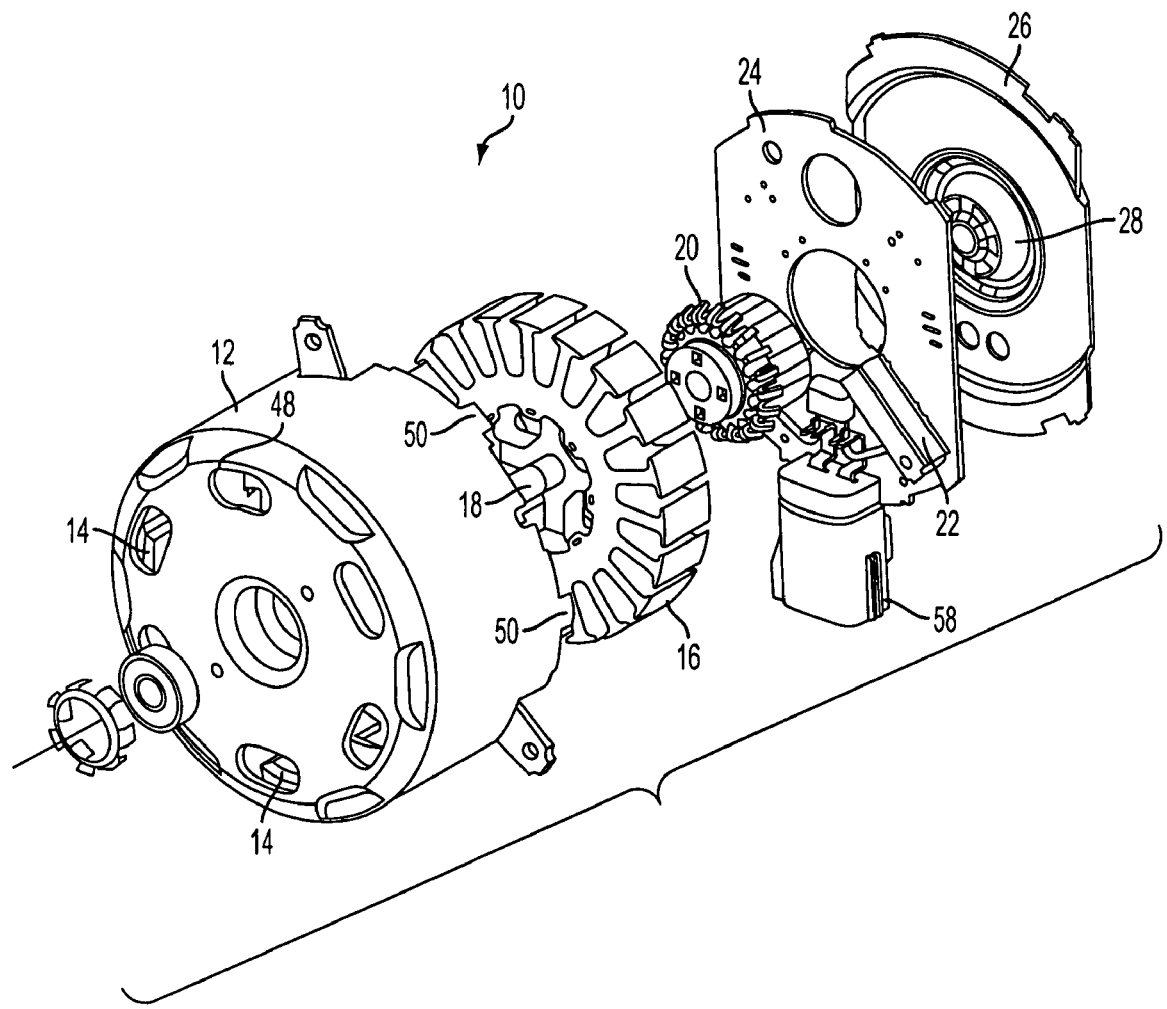
FIG. 1 is an exploded view of a conventional motor assembly of an cooling module.

With reference to FIG. 1, an example of a typical conventional brush card assembly 24 is shown. In the conventional configuration, the brush card assembly 24 is sandwiched between the end cap 26 and the stator/motor case 12 by mechanically deforming staking tabs 50 over the end cap 26. Therefore, the brush card diameter is as large as the stator (motor case 12) outside diameter (OD). To reduce the cost in the conventional configuration, only a partial brush card (not a full circular or round card) is used.

Figure 6:
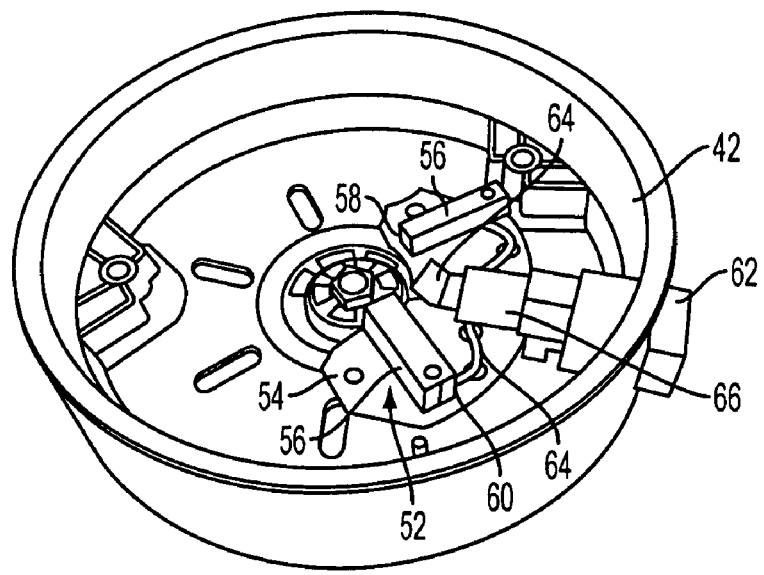
FIG. 6 is a view of a brush and connector unit shown mounted in a cover of the shroud structure, other portions of the shroud structure are not shown.

With the embodiment of a Brush and Connector Unit (BCU), generally indicated at 52, in FIG. 6, the method of assembly to the module is different than the conventional configuration. Therefore, the size of the BCU 52 can be smaller than the stator (motor case 12) OD.

The staking tabs 50 are still present on the motor case 12 as shown in FIG. 2, although they are not being used for mounting neither the end cap (the end cover is integrated into the shroud) nor the brush card. However, since the tabs 50 are provided, stator can advantageously be used with either configuration (conventional or the module of the embodiment), therefore the tooling cost of the stator is saved.

In the conventional configuration of FIG. 1, the brush card 24 could only be assembled axially to the motor using the opening hole in the middle of the brush card. In FIG. 6, the BCU 52 is shown mounted inside the cover 42 of the shroud structure 38. The BCU 52 has similar features and construction techniques as in the conventional brush card assembly, however BCU 52 can be even further simplified, integrated into the cover 42 of the shroud structure 38. In particular, the BCU 52 includes a brush card 54 that is mounted to a surface inside of the cover 42. The mounting features can be molded into the cover 42 or other fastening methods such as riveting or screw fasteners can be employed. The bush card caries brush tubes 56, each housing a brush 58 arranged so as to contact the commutator 20 (FIG. 2) in the conventional manner. Each brush 58 is biased by a spring 60 that is disposed in an associated brush tube 56. The spring 60 is locked during assembly and released after the rotor and stator assembly 30 is mounted into the cover 42. The brush tubes 56 can be integrated into the cover 42 with an electrical connector 62 being associated with the cover 42, so that the brush card 54 is not required. A capacitor 64 for radio frequency interference (RFI) protection, can be provided with legs thereof electrically connected between positive and negative terminals of the connector 62. The brush shunt 64 is electrically connected to a terminal bar of the connector 62. Rubber seals 66 can be provided to seal the terminals in the connector 62.

Additional components can be included into the BCU 52 depending on the requirement of the actual application. The following components can be added to BCU: additional brushes (and corresponding electrical connections) capacitors, diodes, or chokes for further improvement of the EMC (Electro Magnetic Compatibility), RFI (Radio Frequency Interference) levels. Also other electro-mechanical or electronic devices (for the purpose of speed detection and control, or abnormal condition/fault detection and protection devices such as stall, partial stall, high current, high temperature, etc. . . . ) can be integrated into the BCU 52 since the BCU 52 is easily accessible (serviceable). One would assume that the additional components would require more space; however, with integrating the components into cover 42 or BCU 52, the size of the unit can be maintained relatively small. The two brush system with link wound commutator as shown herein is described in U.S. Pat. No. 6,694,599, the content of which is hereby incorporated by reference into this specification.

Figure 7:
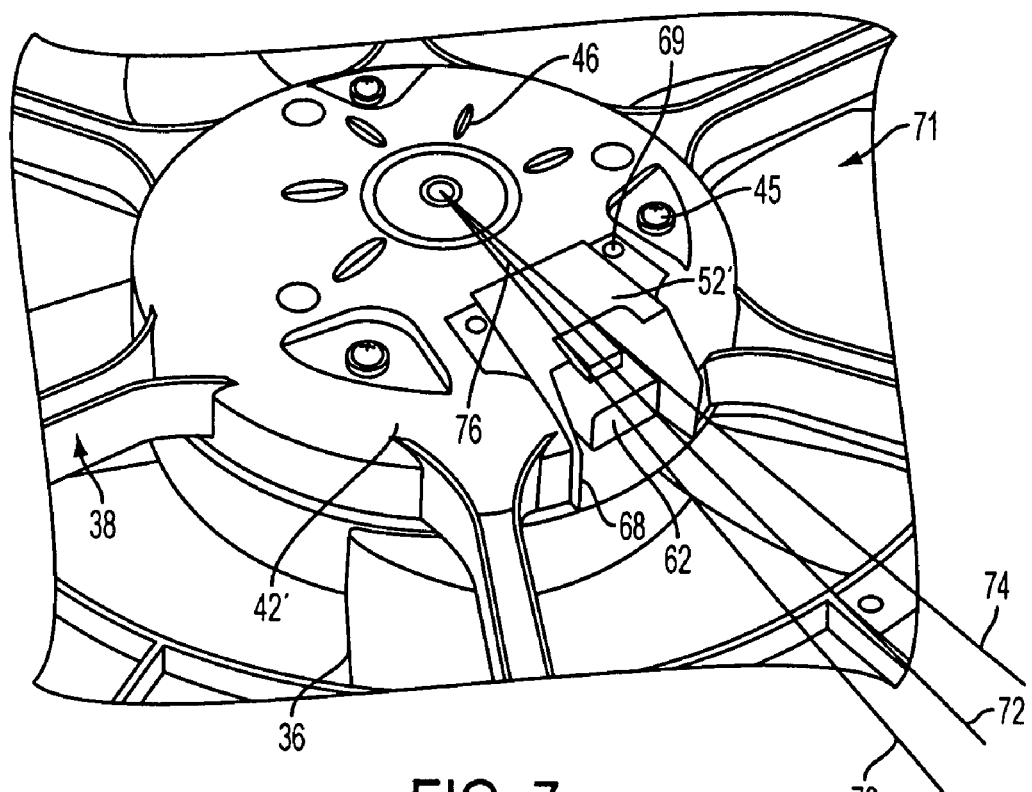
FIG. 7 is a partial view of a fan module of another embodiment of the invention, having a removable and angularly adjustable brush and connector unit.

With reference to FIG. 7, a portion of a fan module, generally indicated at 71, is shown in accordance with another embodiment of the invention. In this embodiment, the BCU 52' is inserted radially through an opening 68 in cover 42' (the opening 68 is preferably defined during molding of the cover 42') and mounted after all other components of the module 71 are attached. Fasteners 69 are preferably used to mount the BCU 52' to the shroud structure 38. With reference to FIG. 7, there are alternative mounting positions, as indicated by lines 70, 72 and 74, available for mounting the BCU 52' onto the cover 42'. Line 72 is the nominal design position of the BCU 52'. The alternative mounting positions 70, 74 of the BCU 52' essentially change the relative angular position of the brushes 58 with respect to the magnets 14. This results in a change of rotational speed of rotor and stator assembly 30 and fan 36. The BCU 52' can be mounted in one of the alternative positions when the operating speed (power) needs to be adjusted. This is an important design option since the product can be tuned (sped up or down or increase/decrease the power). The tuning can be performed at final assembly to improve performance capability (adjust the position of BCU 52' for the products that are out of the speed specification), and to maintain tighter performance range. In conventional motors of the type shown in FIG. 1, tuning is typically done by increasing or decreasing the strength of the magnets and cannot be adjusted at final assembly.

Figure 8:
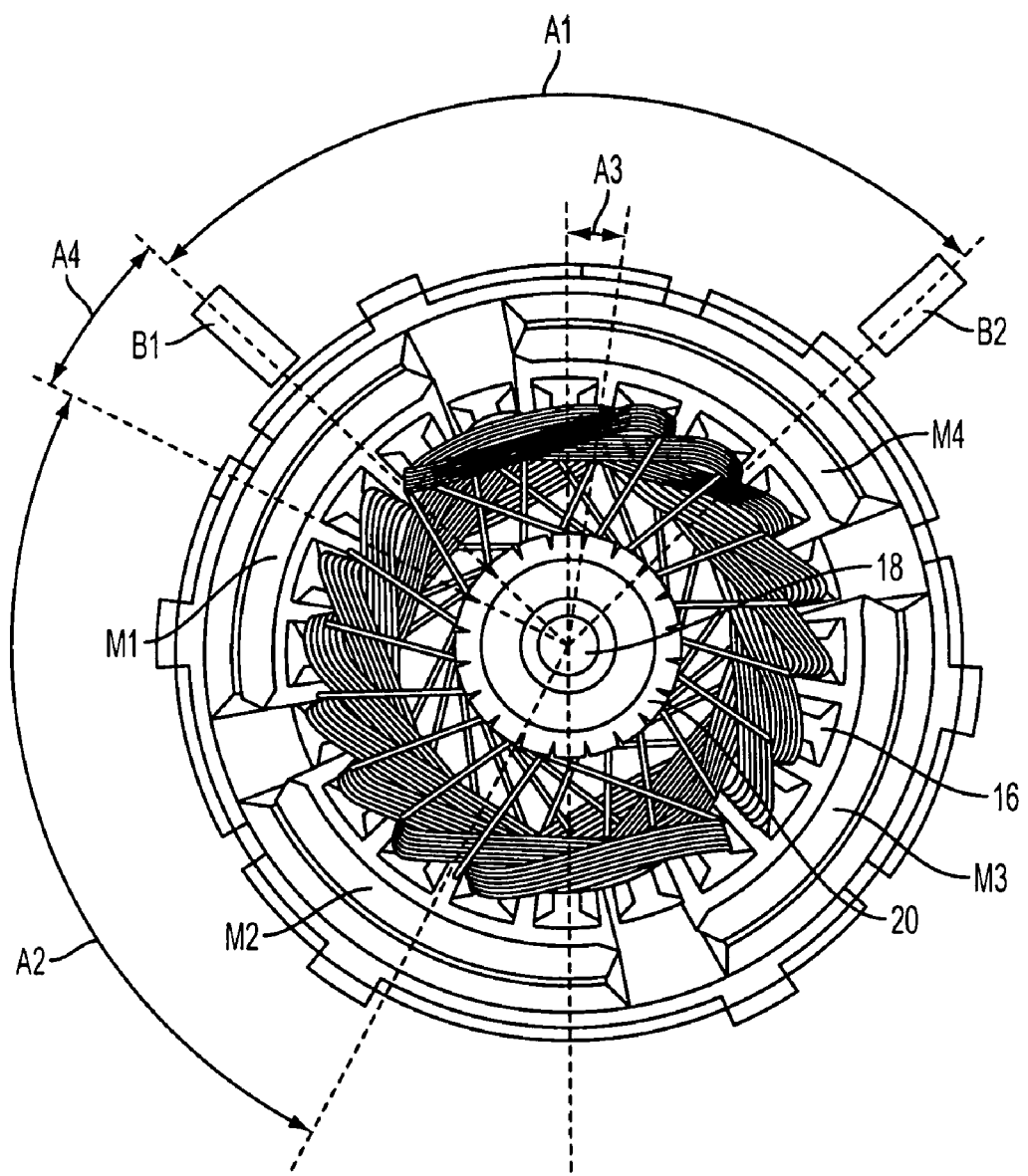
FIG. 8 shows the stator assembly and the critical angles for motor timing of an embodiment of the invention.

FIG. 8 shows the stator assembly 30 (without folded out brackets 32) and the critical angles for motor timing (adjusting the speed).

A1 is the angle between the center of a positive and a negative polarity brush and A1=(360/No. of permanent magnetic flux circuits in the motor); for example A1=90° for a 4 pole permanent magnet direct current (PMDC) motor as shown in FIG. 8; or A1 would be 180° for a 2 pole motor. Also, in the case of the 4 pole motor described herein, B1 is a positive brush and B2 is a negative brush.

A2 is the angle between the center of two adjacent magnets or magnetic poles (with opposite polarity) and A2=(360/No. of permanent magnetic flux circuits in the motor); for example A2=90° for a 4 pole PMDC motor as shown in FIG. 8 or A2 would be 180° for a 2 pole motor. Also in the case of the 4 pole motor described herein, the magnetic pole of the inner face of M1 is North and M2 is South, M3 is North again and M4 is South.

As one can conclude, numerically A1 and A2 are the same and both of them are defined by the desired magnetic pole of a DC motor. However, A1 also can depend on the type of armature winding. Therefore, the angular relationships (A1, A2, A4) defined herein are relevant to an armature with lap winding and this winding is commonly known in the art.

A3 is the angle between the centerline of the lamination tooth and the commutator slot. This angle is maintained by first pressing the shaft 18 through the core assembly 16 then, with a fix tooling, positioning both the commutator 20 and the core assembly 16 relative to each other (angularly with A3 and matching the axis of the shaft 18 with the center of the commutator 20). Next, the commutator 20 is pressed onto the shaft 18.

A4 is the angle between the centerline of a brush and the centerline of a magnet or magnetic pole. In the conventional configuration (FIG. 1) the A4 angle is set by the defined location/position of the brush card assembly onto the motor case and the magnets are attached to the case at the defined consistent position. The timing of the motor can be adjusted by adjusting either A3 or A4 and in the conventional configuration (FIG. 1) this is frozen or fixed by hard tooling after the motor performance was optimized for a specific application.

The advantage of the new configuration with BCU 52' is that the motor timing can be changed (alternative angular positions between 70 and 74 are essentially changing A4).

The adjustability of BCU 52' can be applied for creating common modules 71 for various platforms of a particular vehicle model. Such requirement or condition can occurs with different engine options, or where higher shaft power or towing capacity is required (higher output power from the engine generates higher heat and higher fan speed can increase the heat rejection). With the conventional design for different engine options to obtain higher speed/power modules the motor or even the fan had to be redesigned and this increased the cost of development, tooling, manufacturing etc. . . . . The new module design 71 with adjustable BCU can be used for several vehicle platforms where approximately 5 to 10% speed change (increase or decrease) required. Since the output power of the module 71 is in function of the fan speed (S) to the power of 3 a 5% change in fan speed results an output power change of 16% (10% change in fan speed results a 33% change in power. The output power in function of speed is derived mathematically below:

$P1 = S1 * T1/1352$
$P2 = S2 * T2/1352$
$K = S/(T)^{0.5}$
where:
P1 and P2 are output power in [W] of module 71
S1 and S2 rotational motor/fan speed in [rpm]
T1 and T2 are the torque applied to the motor by the fan in [oz*in]
1352 is a conversion factor
K is the fan constant and also shown on FIG. 9
the T1 and T2 can be expressed in function of K
$T1 = (S1/K)^2$ -continued

```
T2 = (S2/K)^2
then
P1 = S1^3/(1352 * K^2)
P2 = S2^3/(1352 * K^2)
Therefore P2/P1 = (S2/S1)^3
```

Another application of the angularly adjustable and removable BCU 52' can be utilized in dual fan module applications where about 10 Hz speed separation is desirable between the fans. The speed separation requirement is due to NVH reasons (Noise Vibration Harshness). Frequency modulation or beating can result if sufficient fan speed separation does not exist. The position of BCU 52' can be changed at final assembly on a product that failed the speed separation requirement, therefore reducing the scrap and/or rework cost.

Still another application of the angularly adjustable and removable BCU 52' is the ability to change the direction of motor rotation easily without requiring a new brush card assembly/configuration (e.g. with a newly defined fixed A4). The direction of motor rotation can be changed just by rotating the BCU 52' to the new required A4 position and by charging the magnets in opposite polarity (such as that the magnetic pole of the inner face of M1 becomes south and of M2 is north, M3 is south and M4 is north) or reversing electrical polarity to the brushes (B1 would be connected to the ground and B2 to the positive power input). The direction of rotation (clockwise (CW) or counter-clockwise (CCW)) can be molded onto the outside surface of cover 42'. For example, if the rotor and stator assembly 30 uses a four pole stator and twenty slot armature with a twenty bar commutator and lap winding, the rotation of the armature/fan from CW to CCW can be changed by simply reversing the polarity of each magnet and the position of the same BCU 52' (as can be indicated on the cover 42') needs to be rotated by 8° CW (for consistent reference in this specification, the rotational direction is identified at the end 34 of shaft 18 (FIG. 5) of the rotor and stator assembly 30 relative to position line 72). The desired angle between the brushes 58 is 90° at all times however, the angle between the centerline of the brushes relative to the centerline of the magnets can be changed. This angle can vary depending on couple of factors such as: armature winding, brush width/commutator bar width and the relative position of the commutator bars to the centerline or armature slot.

Figure 9:
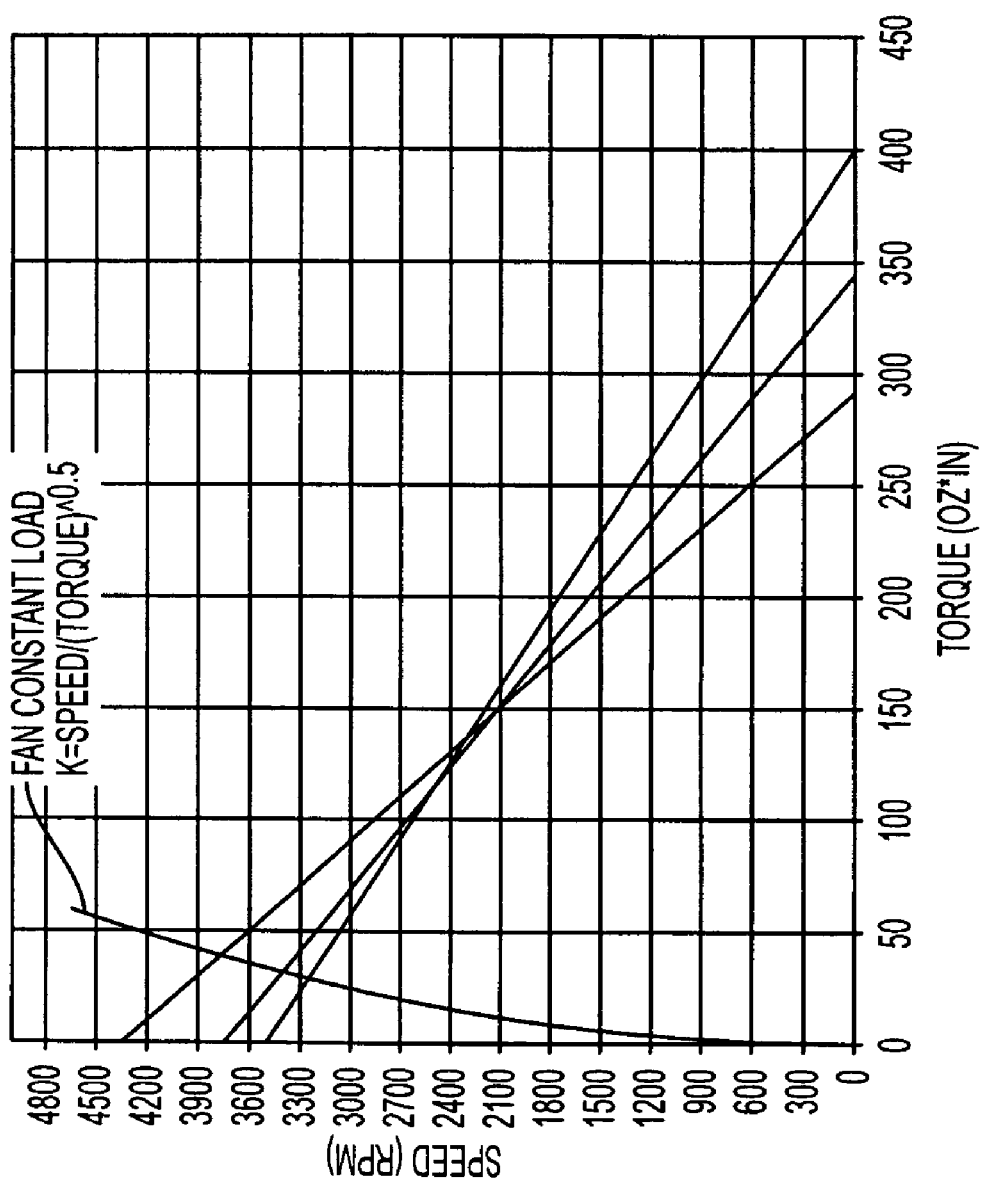
FIG. 9 shows the motor speed as a function of torque at various positions of the BCU of an embodiment of the invention.

FIG. 9 shows the motor speed as a function of torque at various positions of the BCU 52'. In an engine cooling application, the fan would load-up the motor as defined by the K fan constant.

Figure 10:
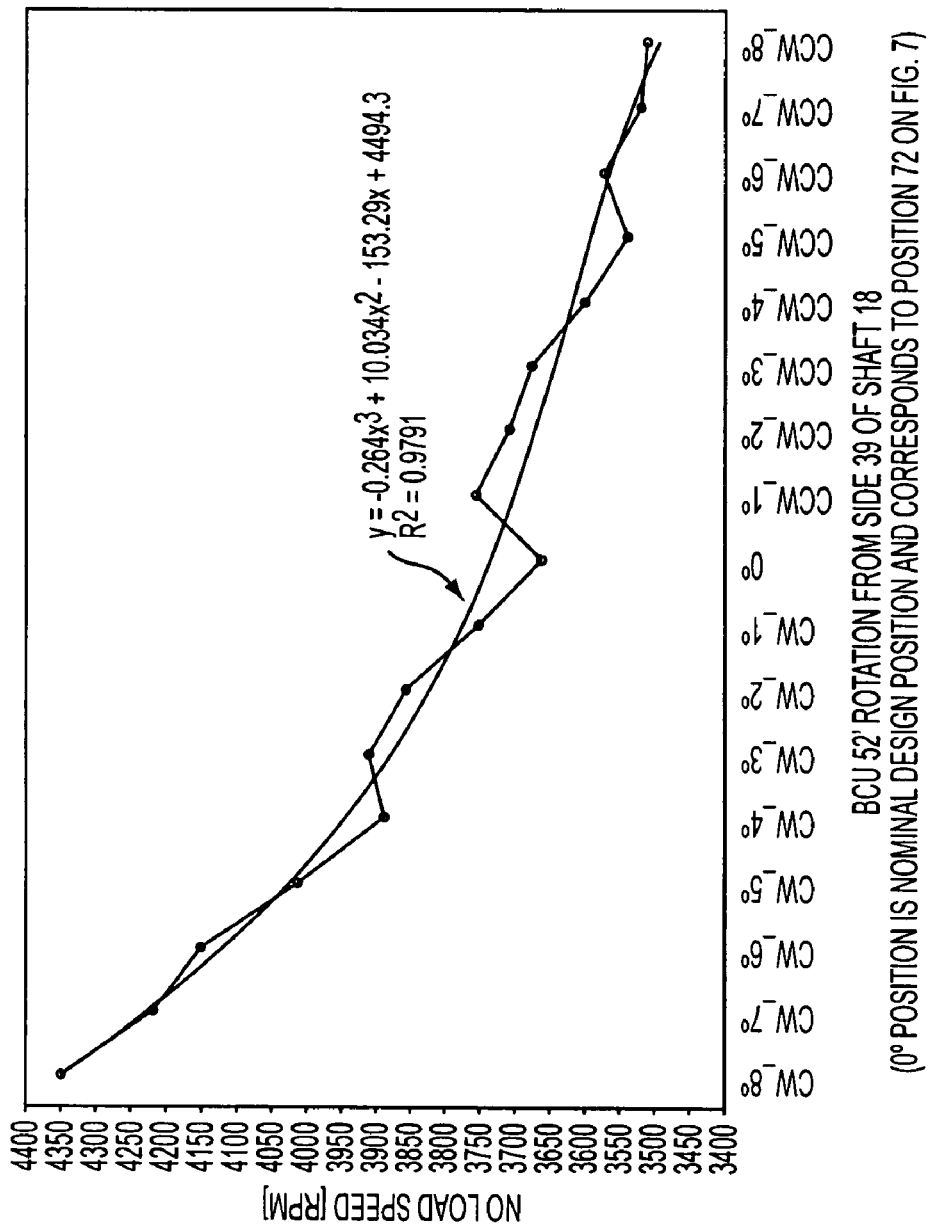
FIG. 10 shows the motor no-load speed as a function of BCU position of an embodiment of the invention.

FIG. 10 shows the motor no-load speed as a function of the BCU position. Thus, on the final assembly line, the BCU for performance test 1 would be mounted on to module 71 at angle 0 (position 72) and, if the motor speed needs to be adjusted, a new position of the BCU can determined from a look-up table such as shown in FIG. 10 and the performance test can be repeated as test 2.

As explained in the above example, selecting the direction of rotation can be done quite easily with no additional cost or component. In conventional motors, two distinctive brush card assemblies are required, one to achieve one direction of rotation, the other for achieving the opposite direction of rotation.

There are many motor configurations (2 pole, 4 pole, 6 pole) with many different armature winding variations. However, all configurations can be incorporated into the configuration of the embodiment, using the advantages of the adjustable BCU 52'.

The angularly adjustable and removable BCU 52' can be very useful and practical in case the part needs to be serviced/reworked. Since the BCU 52' can be removed from the cover 42' even without taking the entire module out of the vehicle, the brushes 58 or any of the BCU 52' components can be reworked or replaced. This feature can significantly reduce costs and is environmentally friendly because less material is being scraped, less energy (e.g., electrical, fuel, natural gas, etc.) is being consumed, and less pollution is being generated. In the conventional module configuration, the brushes or brush card assembly could not be easily replaced. Therefore, the entire motor was scraped and a new motor was mounted onto the shroud. In some conventional configurations, the motor is difficult to remove. Therefore, the entire module must be replaced. To put it into perspective and emphasize the cost advantage of the module 71 of the embodiment, with the serviceable BCU 52': the typical cost of two brushes on the current market is approximately less than 1% of the module cost. From this, one can clearly conclude that the module 71 is environmentally friendly. Typically, commutator life exceeds the useful brush life by a factor of two, thereby making BCU replacement economical. The removable BCU 52' allows for easy inspection or rework of internal components.

The embodiment provides, among others, the following features:

Simplified engine cooling module with rotor and stator assembly 30 and integrated module; the packaging technique reduces component/system cost.

The bearing structure 40 for supporting the motor shaft end 39 of the rotor and stator assembly 30 is integrated into the shroud 38.

The bearing structure housing 44 can be insert molded into the shroud;

The fan with rotor and stator assembly 30 can be balanced before completing the module assembly, therefore saving the cost of balancing the armature.

The cover 42 of the shroud 38 has six functions:
1. Provides structural support for rotor and stator assembly 30 and fan 36
2. Provides coverage/shielding to the rotor and stator assembly 30; environmental protection/shielding from foreign particles and objects,
3. Integrates/houses the bearing structure 40, and allows access to service bearing structure 40.
4. Integrates/houses features for BCU 52, and allow access, and provides mounting features and pre-marked positions for the BCU 52.
5. Provides alternative mounting positions for the BCU 52 to adjust motor performance (lower or increase speed)
6. Provides ventilation holes/features added into the cover 42 to allow airflow through the rotor and stator assembly 30.

Additional features of the embodiment include:

The module is fully serviceable since both the BCU 52 and the rotor and stator assembly 30 can be easily removed and there is no hard mounted end cap covering the rotor and stator assembly 30 as in the conventional configuration.

The rotor and stator assembly 30 can be removed from the module and can be replaced with new one.

In the conventional configuration, the end cap was permanently staked to the motor case. Rework was possible only for the armature; the motor case and magnet assembly were scrapped. The end cap assembly was then scraped after motor disassembly. With the new rotor and stator assembly 30 and integrated module system, all motor subassemblies can be reworked or replaced without scraping or damaging other subassemblies.

Features can be molded into the cover 42 to hold the brush (including RFI components) and connector assembly (requiring no additional brush card).

The partial brush card 54 including the feature for holding the brush (e.g., brush tube) and connector are molded together and it is a one piece unit.

Brushes can be integrated into the connector plastic assembly.

The module is serviceable; just remove the fasteners or release the mounting features of the BCU 52 and place/mount a new BCU 52 onto the module; this even can be done without removing the engine cooling module from the vehicle; (depending on the accessibility of the module system 71 under the hood of the vehicle).

The BCU 52 or components of the BCU 52 can be assembled to the cover 42 prior mounting the rotor and stator assembly. The brushes are locked into the brush holding features and released after the rotor and stator assembly 30 is mounted into cover 42.

The BCU 52 is assembled from the radial direction to the shroud 38 after the rotor and stator assembly 30 is mounted to the cover 42.

The BCU 52' as shown in FIG. 7 is mounted onto the shroud 38 (from the back side or from radial direction) after all other module assemblies are completed.

The fan speed (power) can be adjusted. With the alternative mounting positions of the BCU 52', the motor speed can be changed (sped up or slowed down). The advantage of this system is that the optimum/desirable operating speed can be maintained with a tighter tolerance; also less parts are being rejected for operating speeds being out of specification.

The position of BCU 52' can be changed to adjust the speed separation between the fans in dual module application.

Electro-mechanical and electronic devices can be integrated into the BCU 52 for detecting abnormal operating conditions and protecting the module; and the serviceability of BCU 52 with additional units.

Additional brushes for switch brush operation can be integrated, since the BCU 52 is serviceable. Also, additional RFI and EMC components can be integrated into the BCU 52, 52'.

The BCU 52' can be used with alternative mounting positions for changing the direction of fan rotation.

Since the embodiment uses some of the conventional motor components of FIG. 1, development cost and the risks associated with the change and implementation of the product are lower as compared to a revolutionary configuration where new manufacturing lines (with high capital investments), new tooling and processes are required.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A cooling module comprising:
a shroud having an integral cover, the cover receiving a bearing structure nested directly in the cover,
at least one fan for moving air,
at least one rotor and stator assembly having an opened end and comprising:
a stator removably mounted and in fixed relation with respect to the shroud, the stator having permanent magnets, and
a rotor comprising a lamination stack, windings associated with the lamination stack, a commutator; and a shaft, the rotor being associated with the stator so as to rotate with respect to the stator, one end of the shaft being coupled with the fan, another end of the shaft being received by the bearing structure, and
a brush and connector unit integrated into the cover of the shroud, the brush and connector unit including brushes associated with the commutator, an electrical connector, and a brush card with the brushes mounted thereto, the brush card being mounted directly to an inner surface of the cover, the cover directly covering the opened end of the rotor and stator assembly and covering at least a portion of the brush and connector unit.

2. The module of claim 1, wherein the brush card is removably mounted with respect to the cover.

3. The module of claim 1, wherein the cover is molded from plastic and the brush and connector unit is integrated into the cover.

4. The module of claim 1, wherein the brush and connector unit is constructed and arranged to be adjustably mountable with respect to cover so as to adjust the relative position of the brushes with respect to the magnets.

5. The module of claim 1, wherein the cover includes vent holes therein for air cooling of the rotor and stator assembly.

6. The module of claim 1, wherein the cover includes mounting features and the stator includes a motor case having mounting tabs, the mounting tabs being removably secured to the mounting features via fasteners.

7. The module of claim 1, wherein the bearing structure is integral with the cover.

8. The module of claim 1, wherein the cover is of plastic material and at least a portion of the bearing structure is insert molded with respect to the cover.

9. The module of claim 8, wherein the bearing structure includes a housing, the housing being the insert molded portion.

10. The module of claim 1, wherein the cover includes a pocket therein, the bearing structure being received in the pocket.

11. A cooling module comprising:
a shroud having means for covering, the means for covering receiving a bearing structure nested directly in the means for covering,
means for moving air,
at least one rotor and stator assembly having an opened end and comprising:
a stator removably mounted and in fixed relation with respect to the shroud, the stator having permanent magnets, and
a rotor comprising a lamination stack, windings associated with the lamination stack, a commutator; and a shaft, the rotor being associated with the stator so as to rotate with respect to the stator, one end of the shaft being coupled with the fan, another end of the shaft being received by the bearing structure, and
means, integrated into the means for covering, for providing current to the commutator and thus the windings, the means for providing current including brushes and an electrical connector, the brushes being carried by a brush card, the brush card being mounted directly to an inner surface of the means for covering, the means for covering closing the opened end of the rotor and stator assembly and covering at least a portion of the means for providing current unit.

12. The module of claim 11, wherein the brushes are carried by a brush card, the brush card being removably mounted with respect to the means for covering.

13. The module of claim 11, wherein the means for covering is a cover molded from plastic and integral with the shroud and the means for providing current is a brush and connector unit integrated into the cover.

14. The module of claim 11, wherein the means for providing current includes brushes constructed and arranged to be adjustably mountable with respect to means for covering so as to adjust the relative position of the brushes with respect to the magnets.

15. The module of claim 11, wherein the means for covering includes vent holes therein for air cooling of the rotor and stator assembly.

16. The module of claim 11, wherein the means for covering includes mounting features and the stator includes a motor case having mounting tabs, the mounting tabs being removably secured to the mounting features via fasteners.

17. The module of claim 11, wherein the bearing structure is integral with the means for covering.

18. The module of claim 11, wherein the means for covering is a cover of plastic material and at least a portion of the bearing structure is insert molded with respect to the cover.

19. The module of claim 18, wherein the bearing structure includes a housing, the housing being the insert molded portion.

20. The module of claim 11, wherein the means for covering includes a pocket therein, the bearing structure being received in the pocket.

* * * * *